United States Patent
Bower

(10) Patent No.: US 7,469,784 B1
(45) Date of Patent: Dec. 30, 2008

(54) COMBINED FUNNEL KIT AND FLUID COLLECTION DEVICE

(76) Inventor: Douglas M. Bower, 8140 S. Estes St., Littleton, CO (US) 80128

( * ) Notice: Subject to any disclaimer, the term of this patent is extended or adjusted under 35 U.S.C. 154(b) by 449 days.

(21) Appl. No.: 10/899,430

(22) Filed: Jul. 26, 2004

(51) Int. Cl.
*B65D 69/00* (2006.01)
*B65B 1/04* (2006.01)

(52) U.S. Cl. ...................... 206/223; 141/319

(58) Field of Classification Search .......... 206/223, 206/216, 319, 335, 361, 372–379; 220/571, 220/573, 288, 254.8, 735, 736, 86.1, 86.2, 220/DIG. 7; 215/44, 228; 141/319
See application file for complete search history.

(56) References Cited

U.S. PATENT DOCUMENTS

| | | | |
|---|---|---|---|
| 2,324,655 A | 7/1943 | Tozer | |
| 3,654,969 A | 4/1972 | Vazquez et al. | |
| 4,673,081 A * | 6/1987 | Habig et al. | 206/223 |
| 4,756,411 A * | 7/1988 | Garland | 206/223 |
| 4,789,017 A | 12/1988 | Panasewicz et al. | |
| D310,170 S * | 8/1990 | Bartz | D15/152 |
| D341,520 S | 11/1993 | LaBelle | |
| 5,285,824 A * | 2/1994 | Krstovic | 141/1 |
| 5,641,007 A | 6/1997 | Falk | |
| 5,967,201 A | 10/1999 | Gasior | |
| 5,967,203 A | 10/1999 | Culver, III | |
| D426,385 S * | 6/2000 | Fang | D3/282 |
| 6,352,167 B1 * | 3/2002 | Yu | 220/522 |
| 6,588,463 B2 | 7/2003 | Swan | |
| 6,880,589 B2 * | 4/2005 | Camoli | 141/98 |

* cited by examiner

*Primary Examiner*—J. Gregory Pickett

(57) ABSTRACT

An automotive kit for catching oil drippings includes a housing having a base section and a lid section pivotally connected therewith, an outlet formed within the housing for defining a passageway to advantageously direct fluid outwardly from the housing when the kit is disposed along a vertical plane. The present invention further includes a plurality of automotive accessories, and a mechanism for advantageously maintaining the accessories at a substantially stable position when positioned within the housing. An end cap is securable to the outlet for preventing fluid from exiting the passageway, and a reservoir is connectable to the outlet for collecting fluid traveling downwardly from the housing. A conventional 1 quart bottle of oil may be attached to the housing outlet for collecting oil drippings wherein the outlet includes a lip portion for directing the oil drippings towards the center thereof.

10 Claims, 5 Drawing Sheets

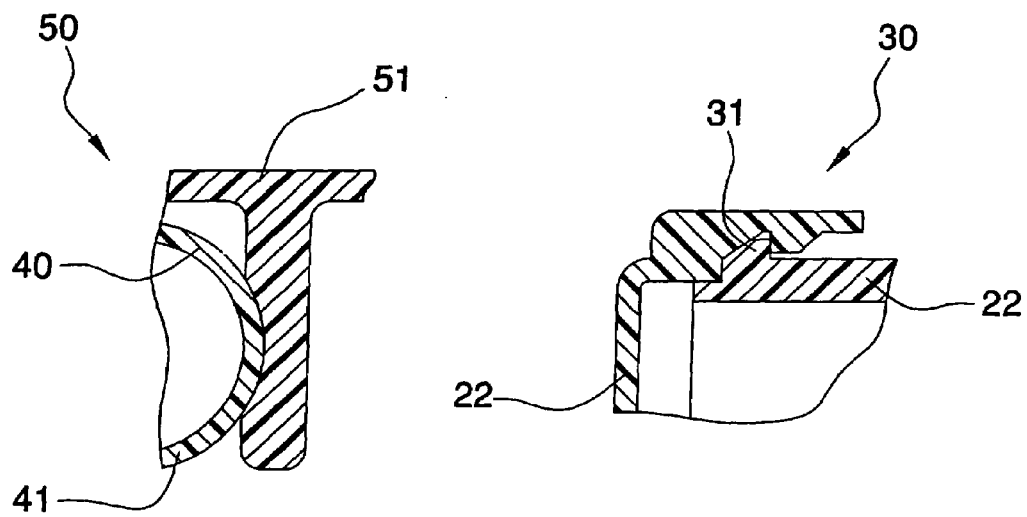
FIG.4
FIG.5
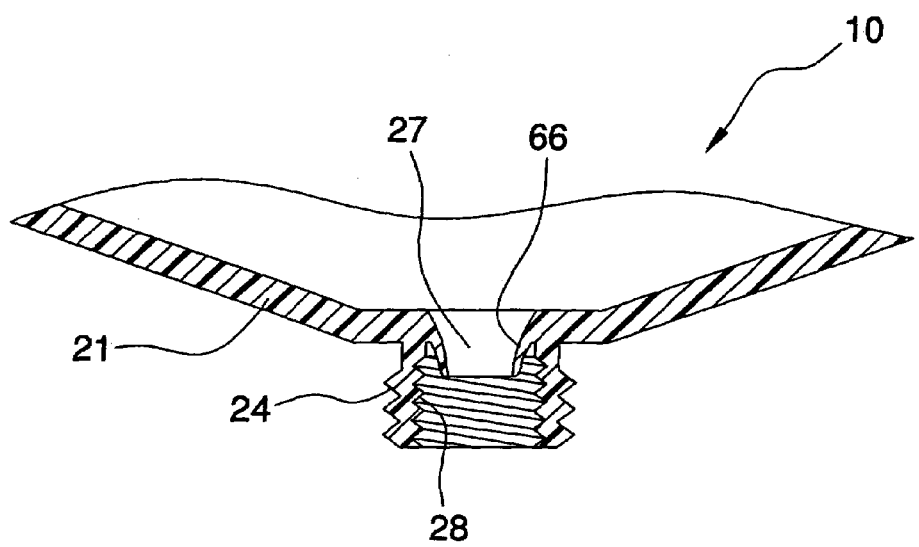
FIG.6

COMBINED FUNNEL KIT AND FLUID COLLECTION DEVICE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a funnel kit and, more particularly, to a combined funnel kit and fluid collection device for use in various industries.

2. Prior Art

The use of funnels is known in the prior art. More specifically, funnels heretofore devised and utilized for the purpose of draining single containers of fluid within various ports of a vehicle are known to consist basically of familiar, expected and obvious structural configurations, notwithstanding the myriad of designs encompassed by the crowded prior art which have been developed for the fulfillment of countless objectives and requirements.

Individuals have discovered that viscous substances, such as motor oil, normally require an extremely extended period of time to adequately drain the residue from the funnel which was used to deliver the particular substance. With motor oil, to reduce the waste, some individuals will allow for each funnel to sit in the oil pan for a long period of time. Though somewhat efficient, all the residue is not drained into the oil pan. Additionally, since some vehicles require four, five, or even six quarts of oil, this method can be extremely time consuming.

In addition to draining, funnels may require brush cleaning if they are immediately required for use other than delivering oil to a car. Many automotive mechanics do not wish to contaminate their plastic wire brushes, which might be required for alternate use, with oil from the funnel, thus requiring them to purchase separate brushes for this purpose.

Accordingly, a need remains for a combined funnel kit and fluid collection device to overcome the above-noted shortcomings.

BRIEF SUMMARY OF THE INVENTION

In view of the foregoing background, it is therefore an object of the present invention to provide a combined funnel kit and use of any empty 1 quart oil bottle, as a fluid collection device. These and other objects, features, and advantages of the invention are provided by an automotive kit for catching oil drippings.

The kit includes a housing that has a base section, a lid section and preferably a substantially planar outer surface for receiving an adhesive label thereon. The lid section is pivotally connected and selectively engageable with the base section. The base section further has a plurality of uniquely shaped depressions formed therein for receiving a plurality of automotive accessories (described hereinbelow). The housing may further include a latch member connected to the lid section, wherein the latch has a flange portion removably engageable with a select portion of the base section for maintaining the housing at a closed position.

The housing further has an outlet formed subjacent to the plurality of depressions that defines a passageway for advantageously directing fluid outwardly from the housing when the kit is disposed along a vertical plane. The housing conveniently includes a handle extending upwardly from the base section for allowing a user to effectively hang the kit at an elevated position.

The present invention also includes a plurality of automotive accessories selectively positionable within the plurality of depressions during non-operating conditions. The plurality of accessories may be comprised of at least one funnel, at least one flexible conduit removably attachable to the at least one funnel, for providing an extension therefore respectively, and a cleaning brush.

The device further includes a mechanism for advantageously maintaining the plurality of accessories at a substantially stable position when stored within the housing. The maintaining mechanism preferably includes a plurality of clips connected to the base section and selectively spaced apart at predetermined positions for receiving corresponding ones of the plurality of accessories therebetween.

The device also includes an end cap threadably securable to the outlet for effectively preventing fluid from exiting the passageway. Advantageously, any conventional 1 quart bottle of motor oil, hereinafter referred to as collecting apparatus, may be threadably secured to the outlet for collecting fluid traveling downwardly from the housing. The collecting apparatus is removably securable to the outlet when the end cap is removed therefrom. Such an apparatus preferably includes a reservoir (vessel) that has a threaded top opening, such as conventional motor oil bottles, wherein the outlet has a threaded inner surface for securely receiving the apparatus thereat.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 4 is an enlarged cross-sectional view of a clip engaging an accessory, taken along line 4-4;

FIG. 5 is an enlarged cross-sectional view of the latch shown in FIG. 1, taken along line 5-5;

FIG. 6 is an enlarged cross-sectional view showing the lip portion cooperating with the threaded inner surface of the housing outlet, taken along line 6-6.

DETAILED DESCRIPTION OF THE INVENTION

Figure 1:
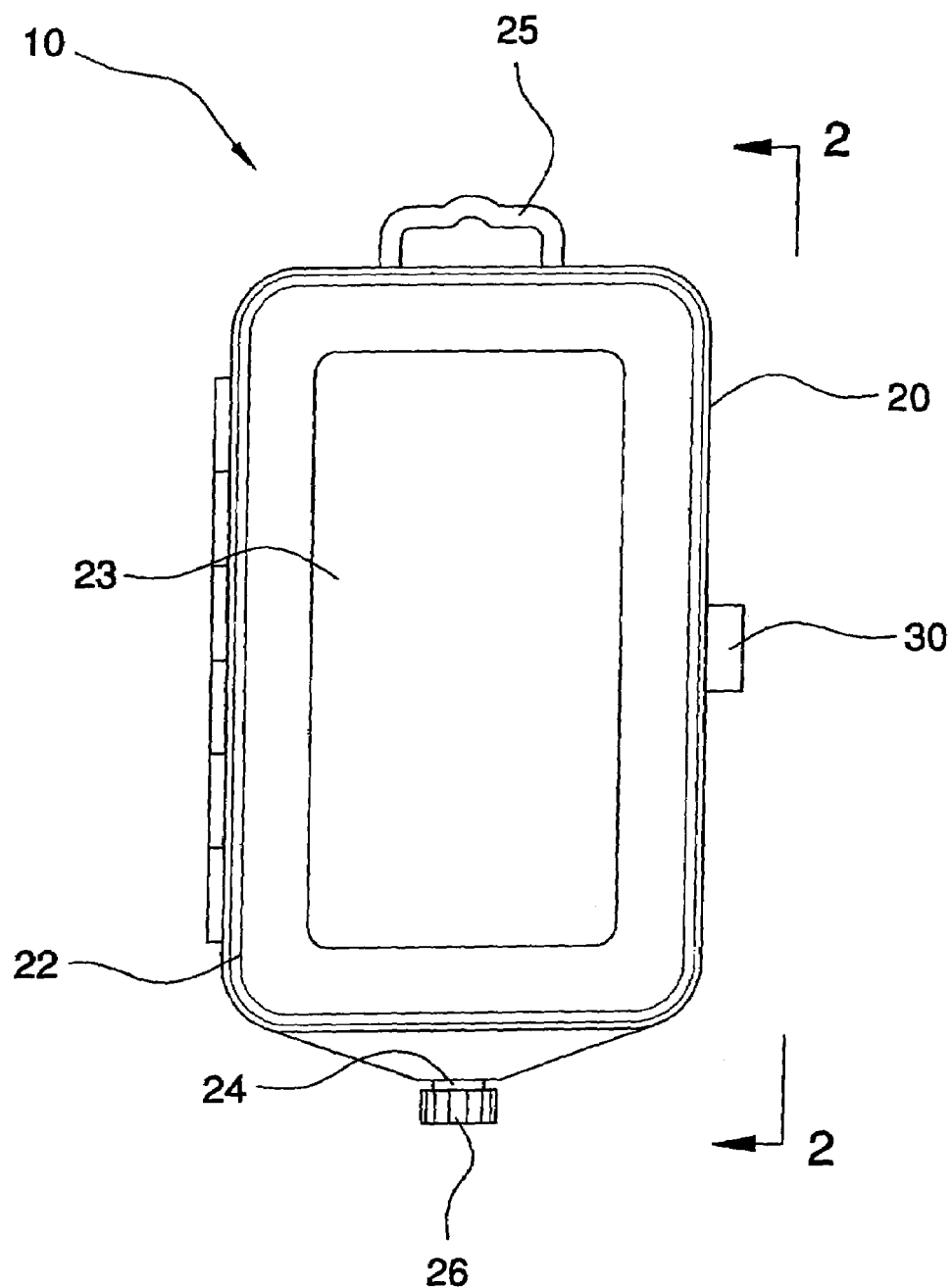
FIG. 1 is a front elevational view showing a combined funnel kit and fluid collection device, in accordance with the present invention.
Figure 2:
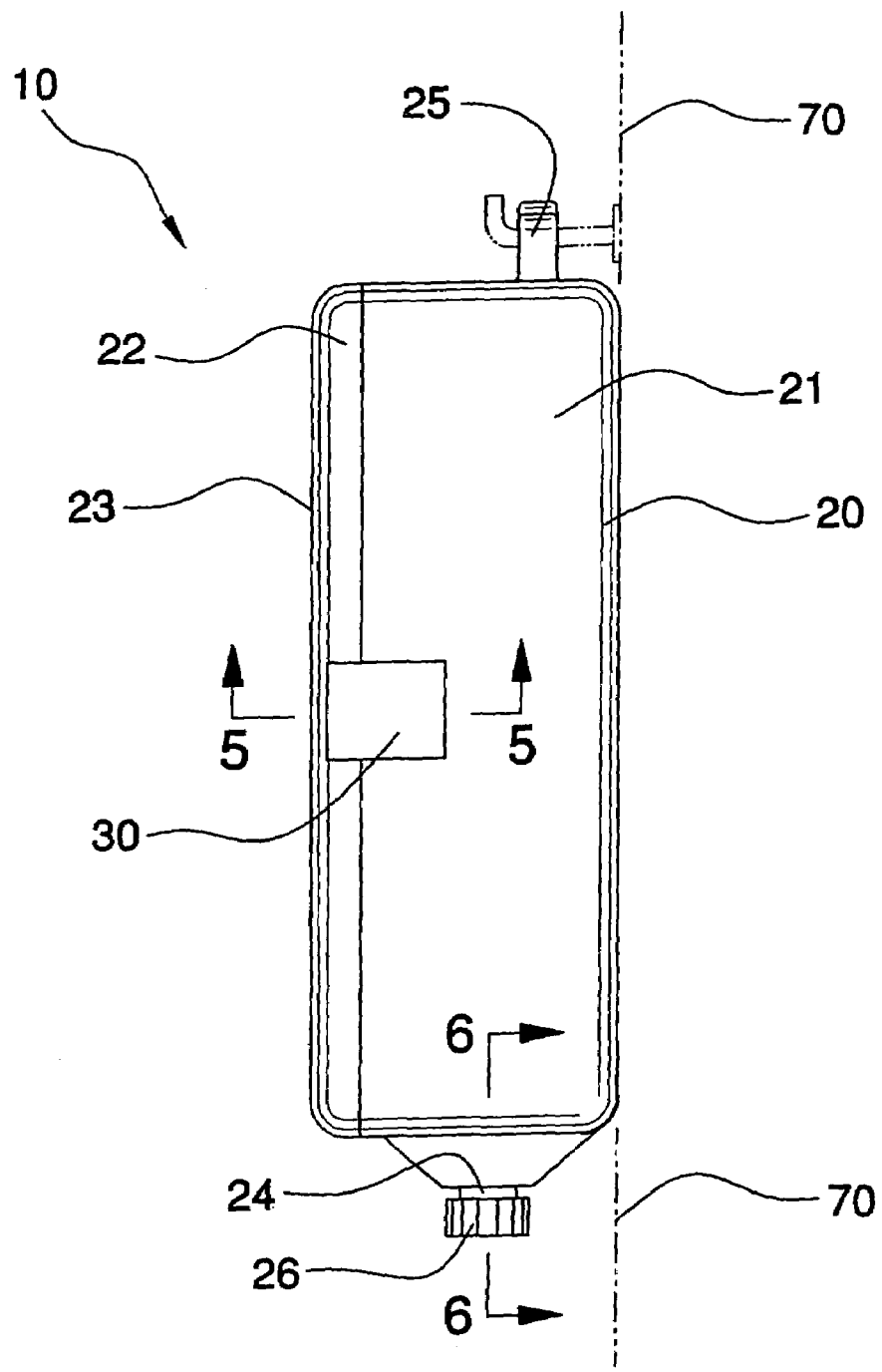
FIG. 2 is a side elevational view of the device shown in FIG. 1.
Figure 3:
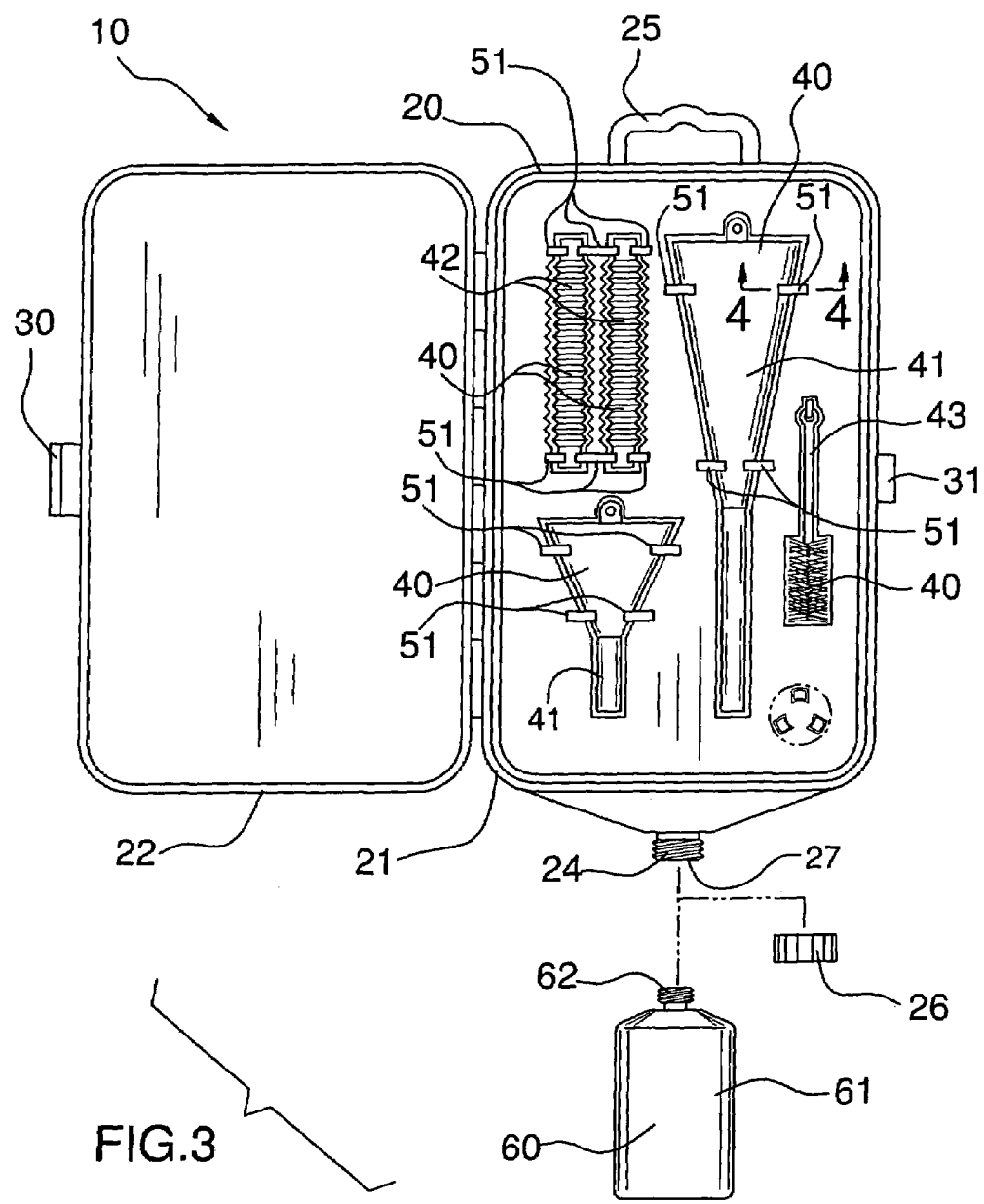
FIG. 3 is a front elevational view showing a plurality of automotive accessories stored within the housing.
Figure 7:
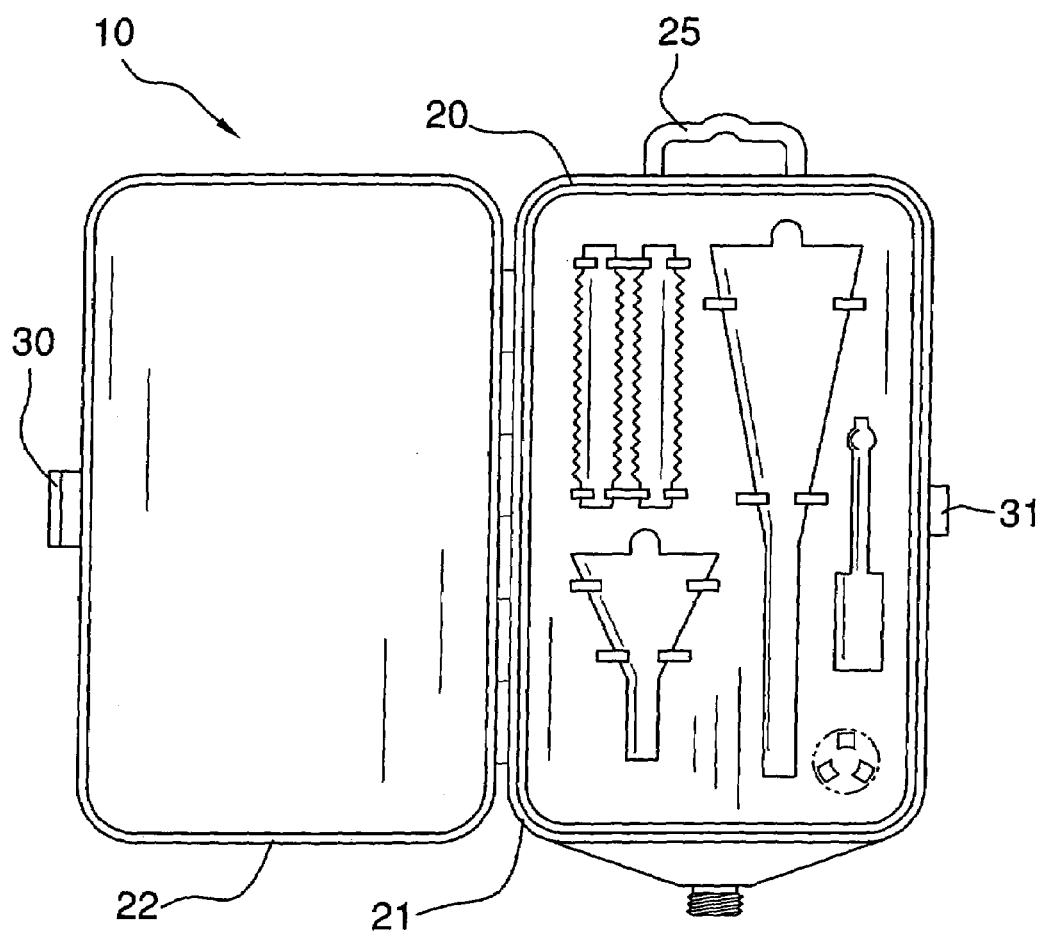
FIG. 7 is front elevational view showing the uniquely shaped depressions formed in the housing for holding the accessories.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-6 by the reference numeral 10 and is intended to provide a combined funnel kit and fluid collection device. It should be understood that the device 10 may be used to drain many different types of fluid and should not be limited to only motor oil.

Referring initially to FIG. 1, the device 10 includes a housing 20 that has a base section 21, a lid section 22 and a substantially planar outer surface 23 for receiving an adhesive label thereon. The lid 22 section is pivotally connected and selectively engageable with the base section 21. The base section 21 further has a plurality of uniquely shaped depressions (not shown) formed therein for receiving a plurality of automotive accessories 40 (described hereinbelow). The housing 20 further includes a latch member 30 connected to the lid section 22, wherein the latch 30 has a flange portion 31 removably engageable with a select portion of the base section 21 for maintaining the housing 20 at a closed position. Advantageously, the automotive accessories 40 can be effectively maintained in the kit even if the accessories 40 become dislodged, or the kit becomes knocked off its support surface.

The housing 20 further has an outlet 24 formed subjacent to the plurality of depressions (not shown) that defines a passageway 27 for advantageously directing fluid outwardly from the housing 20 when the kit 10 is disposed along a vertical plane 70. The housing 20 conveniently includes a handle 25 extending upwardly from the base section 21 for allowing a user to effectively hang the kit 10 at an elevated position.

The present invention also includes a plurality of automotive accessories 40 selectively positionable within the plurality of depressions (not shown) during non-operating conditions. The fact that the housing 20 is disposed at a vertical position along the plane 70 conveniently allows any fluid residue to automatically drip from the accessories 40, thereby limiting tedious cleaning efforts. The plurality of accessories 40 is comprised of at least one funnel 41, at least one flexible conduit 42 removably attachable to the at least one funnel 41, for providing an extension therefore respectively, and a cleaning brush 43.

The device 10 further includes a mechanism 50 for advantageously maintaining the plurality of accessories 40 at a substantially stable position when stored within the housing 20. The maintaining mechanism 50 includes a plurality of clips 51 connected to the base section 21 and selectively spaced apart at predetermined positions for receiving corresponding ones of the plurality of accessories 40 therebetween.

The device 10 also includes an end cap 26 threadably securable to the outlet 24 for effectively preventing fluid from exiting the passageway 27. Any empty 1 quart bottle of motor oil 60 may be employed by the present invention for advantageously collecting fluid traveling downwardly from the housing 20. Such a motor oil bottle 60, hereinafter refereed to as a collecting apparatus, is removably securable to the outlet 24 when the end cap 26 is removed therefrom. Advantageously, apparatus 60 may include any conventional 1 quart motor oil bottle or reservoir 61 (vessel) that has a threaded top opening 62, wherein the outlet 24 has a threaded inner surface 28 for securely receiving the apparatus 60 thereat. Referring specifically to FIG. 6, the outlet is provided with a lip portion 66 sloping downwardly towards the longitudinal axis so that oil drippings can be effectively directed into the reservoir 61 rather than about the top opening 62 thereof.

Instead of lubricant and other automotive fluids being dripped on the garage floor and/or workbench, the funnels 41 can be suspended within the device 10 for drainage. This helps prevent time consuming cleanup, as well as unsightly stains.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An automotive kit for catching oil drippings, said kit comprising:
    a housing having a base section and a lid section pivotally connected and selectively engageable therewith, said base section having a plurality of uniquely shaped depressions formed therein, said housing further having a outlet formed subjacent the plurality of depressions and defining a passageway for directing fluid outwardly from said housing when said kit is disposed along a vertical plane, said housing comprising a handle extending upwardly therefrom said base section for allowing a user to hang said kit at an elevated position;
    a plurality of automotive accessories selectively positionable within the plurality of depressions during non-operating conditions;
    means for maintaining said plurality of accessories at a substantially stable position when positioned within said housing;
    an end cap threadably securable to the outlet for preventing fluid from exiting the passageway; and
    means for collecting fluid traveling downwardly from said housing, said collecting means be removably securable to the outlet when said end cap is removed therefrom;
    wherein said plurality of accessories comprise
        at least one funnel;
        at least one flexible conduit removably attachable to said at least one funnel and for providing an extension therefore respectively; and
        a cleaning brush.

2. The funnel kit of claim 1, wherein said housing further comprises: a latch member connected to said lid section and having a flange portion removably engageable with a select portion of said base section.

3. The funnel kit of claim 1, wherein said collecting means comprises:
    a reservoir having a threaded top opening.

4. The funnel kit of claim 1, wherein the outlet further has a threaded inner surface for securely receiving said collecting means thereat.

5. The funnel kit of claim 1, wherein said lid section has a substantially planar outer surface for receiving an adhesive label thereon.

6. An automotive kit for catching oil drippings, said kit comprising:
- a housing having a base section and a lid section pivotally connected and selectively engageable therewith, said base section having a plurality of uniquely shaped depressions formed therein, said housing further having a outlet formed subjacent the plurality of depressions and defining a passageway for directing fluid outwardly from said housing when said kit is disposed along a vertical plane, said housing comprising a handle extending upwardly therefrom said base section for allowing a user to hang said kit at an elevated position;
- a plurality of automotive accessories selectively positionable within the plurality of depressions during non-operating conditions;
- means for maintaining said plurality of accessories at a substantially stable position when positioned within said housing;
- an end cap threadably securable to the outlet for preventing fluid from exiting the passageway; and
- means for collecting fluid traveling downwardly from said housing, said collecting means be removably securable to the outlet when said end cap is removed therefrom;
- said maintaining means comprising a plurality of clips connected to said base section and being selectively spaced apart at predetermined positions for receiving corresponding ones of said plurality of accessories therebetween;
- said plurality of accessories comprising
  - at least one funnel,
  - at least one flexible conduit removably attachable to said at least one funnel and for providing an extension therefore respectively, and
  - a cleaning brush.

7. The funnel kit of claim 6, wherein said housing further comprises; a latch member connected to said lid section and having a flange portion removably engageable with a select portion of said base section.

8. The funnel kit of claim 6, wherein said collecting means comprises: a reservoir having a threaded top opening.

9. The funnel kit of claim 6, wherein the outlet further has a threaded inner surface for securely receiving said collecting means thereat.

10. The funnel kit of claim 6, wherein said lid section has a substantially planar outer surface for receiving an adhesive label thereon.

\* \* \* \* \*